US011620223B2

(12) United States Patent
Barner et al.

(10) Patent No.: US 11,620,223 B2
(45) Date of Patent: *Apr. 4, 2023

(54) LOW LATENCY INTER-CHIP COMMUNICATION MECHANISM IN A MULTI-CHIP PROCESSING SYSTEM

(71) Applicant: Marvell Asia Pte, Ltd., Singapore (SG)

(72) Inventors: Craig Barner, Shrewsbury, MA (US); David Asher, Sutton, MA (US); Richard Kessler, Northborough, MA (US); Bradley Dobbie, Medford, MA (US); Daniel Dever, North Brookfield, MA (US); Thomas F. Hummel, Westborough, MA (US); Isam Akkawi, Santa Clara, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,959

(22) Filed: Aug. 12, 2021

(65) Prior Publication Data

US 2021/0374057 A1 Dec. 2, 2021

Related U.S. Application Data

(63) Continuation of application No. 16/264,386, filed on Jan. 31, 2019, now Pat. No. 11,119,929.

(51) Int. Cl.
*G06F 12/00* (2006.01)
*G06F 12/084* (2016.01)
*G06F 12/0842* (2016.01)
*G06F 12/0813* (2016.01)

(52) U.S. Cl.
CPC ........ *G06F 12/084* (2013.01); *G06F 12/0813* (2013.01); *G06F 12/0842* (2013.01); *G06F 2212/154* (2013.01)

(58) Field of Classification Search
None
See application file for complete search history.

(56) References Cited

U.S. PATENT DOCUMENTS

2019/0391928 A1* 12/2019 Lin .................. G06F 12/109
2020/0076435 A1* 3/2020 Wang ............... H03K 19/17724

* cited by examiner

*Primary Examiner* — Midys Rojas (57) ABSTRACT

Systems and methods of multi-chip processing with low latency and congestion. In a multi-chip processing system, each chip includes a plurality of clusters arranged in a mesh design. A respective interconnect controller is disposed at the end of each column. The column is linked to a corresponding remote column in the other chip. A share cache controller in the column is paired with a corresponding cache controller in the remote column, the pair of cache controllers are configured to control data caching for a same set of main memory locations. Communications between cross-chip cache controllers are performed within linked columns of clusters via the column-specific inter-chip interconnect controllers.

20 Claims, 10 Drawing Sheets

LOW LATENCY INTER-CHIP COMMUNICATION MECHANISM IN A MULTI-CHIP PROCESSING SYSTEM

RELATED U.S. APPLICATION

This application is a continuation application of U.S. application Ser. No. 16/264,386, "Low Latency Inter-Chip Communication Mechanism in Multi-Chip Processing System," filed Jan. 31, 2019, hereby incorporated by reference in its entirety.

TECHNICAL FIELD

Embodiments of the present invention are related to the field of microprocessors, and in particular, to inter-chip communication mechanisms in multi-chip processing systems.

BACKGROUND OF THE INVENTION

A multi-core processor chip is a computing component having two or more independent processing units, or so-called "processing cores" or "core processors," which reads and executes program instructions. A multi-core processor architecture offers significantly enhanced processing speed, capacity and performance in systems in various application domains, such as general-purpose computing, embedded systems, network systems, digital signal processing, and graphics processing. As the number of core processors within a multi-core chip increases, managing access to corresponding on-chip and off-chip shared memory becomes more and more challenging. It is important to develop mechanisms to reduce the related communication latency and congestion.

In a multi-chip system, multiple multi-core processor chips are interconnected to share resources and operate as a coherent system. Inter-chip communication delay is critical to system performance. One aspect of this delay is ascribed to the distances that communication signals have to traverse from their sources to their destinations, e.g., from a processor core to an inter-chip interconnect controller and then to a select Serializer/Deserializer (SerDes) to transmit the signals to a coupled chip. For example, in a 2-socket system, an inter-chip interconnect controller is disposed between the two sockets. Unfortunately, communications between cache controllers residing in different chips via the interconnect controller contribute to a major part of inter-chip communication traffic.

SUMMARY OF THE INVENTION

Therefore, it is desirable to develop a multi-chip processing system with optimized communication paths for inter-chip cache controller communications. Embodiments of the present disclosure are directed to a chip architecture that allows low-latency and low congestion communications across chips in a multi-chip system.

Embodiments of the present disclosure include a multi-chip processing system in which each chip ("the instant chip") includes a plurality of processor clusters arranged in multiple columns, and each column of clusters has its own inter-chip interconnect interface that are dedicated to traffic on the instant column. Each cluster has a set of core processors and a shared cache controller. Each column of clusters is linked to a corresponding column of clusters ("the linked column") in another chip ("the remote chip") via an inter-chip interconnect interface located at the end of the column. Each cluster in the column is paired with a remote cluster in the linked column, and a shared cache controller in the cluster is paired with a corresponding shared cache controller in the remote cluster. The paired cache controllers residing on different chips are configured to cache data for a same set of main memory addresses (e.g., an off-chip main memory). That is, a data block associated with the set of main memory addresses may have copies in one or both of the paired shared caches, local caches within the core processors and/or the main memory.

In one embodiment, during operation, when a shared cache controller receives a memory request from a core processor (e.g., a core processor in the same chip), it determines if the requested data is cached in, and can be satisfied by, the shared cache in the instant chip or can be satisfied by a request to the local memory controller (e.g., a local DRAM controller). If not, the memory requested is sent to the interconnect interface at the end of the column through a column-specific inter-chip path. The interconnect interface forwards the request to the corresponding shared cache controller comprised in the linked column in the remote chip to determine whether the requested data is cached in the remote chip. If not, the request may be directed to the main memory where the requested address resides.

In this configuration, inter-chip cache controller communications are performed within each pair of linked columns via an inter-ship interconnect interfaces dedicated to the pair of linked columns. Thus, the propagation latency of inter-chip communications can be advantageously and significantly reduced through the direct and dedicated paths. Further, by using column-specific communication paths and interconnect controllers and inter-chip paths, the chip routing design can be simplified and routing congestion can be significantly reduced.

In some embodiments, the clusters in each chip are arranged in the same mesh layout. All the clusters in each column are coupled to an inter-chip interconnect interface dedicated to this column. Two shared cache controllers located in two linked columns respectively are paired. Depending on the configuration of the multi-chip system, paired cache controllers may have the same or different natural column indices in the mesh layout. Pairing of cache controllers may be dependent on the relative installation orientations of the two chips. Further, paired cache controllers may have the same or different natural row indices in the mesh layout. In one embodiment, each pair of linked columns, as well as each pair of shared cache controllers, have mirrored column indices. Particularly, a column on the first chip has the index j, and its linked column on the second chip has the index n-j, where n represents the total number of columns in one chip. In one embodiment, each pair of linked columns, as well as each pair of shared cache controllers, have mirrored row indices.

In one embodiment, when a shared cache controller determines to send a memory request to the corresponding remote cache controller, it identifies the remote cache controller by using the requested memory address in combination with an indication of relative column indices and/or relative row indices between paired cache controllers.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Low Latency Inter-Chip Communication Mechanism in Multi-Chip Processing System

Embodiments of the present disclosure provide systems and methods of multi-chip processing and communication that offers low communication latency and low routing congestion. Communications between cross-chip cache controllers are performed within linked columns of clusters via column-specific inter-chip interconnect controllers. In some embodiments, each chip includes a plurality of clusters arranged in a mesh design. For each column ("the instant column"), a dedicated interconnect controller is disposed at the end. Via the interconnect controller and an external link, the column is linked to a corresponding remote column of another chip having the same mesh design. A shared memory cache controller in the instant column is paired with a corresponding shared memory cache controller in the remote column, the pair of cache controllers configured to control data caching for a same set of main memory locations. When a cached controller communicates to the other in the pair with regard to a memory request, the communication signals are sent down to the interconnect controller of the instant column and then transmitted to the linked remote column.

As used herein, the terms of "local" as in "local shared cache controller" or "local shared cache" means local to the instant chip. The terms of "local shared cache controller" and "local cache controller" may be used interchangeably; and the terms of "remote shared cache controller" and "remote cache controller" may be used interchangeably.

As used herein, a memory request refers to a message or command for information (e.g., a block of data) from a memory (e.g., a cache or main memory). A memory request may be a read/load operation to request a copy of a data block. A memory request may be a store/write operation to store a cached data block, or parts of a cached data block, in main memory. A memory request may be a cache write-back operation or a cache replacement operation or a snoop. These are examples only, and the present invention is not so limited.

In some embodiments, a memory request that includes a main memory address is generated by a core processor or an input/output bridge (IOB) on behalf of a coprocessor. The memory request also specifies a type of a memory access operation (e.g., a read/load operation or a store/write operation) associated with an instance of data (e.g., a data block). One or more caches as well as the associated cache controllers (e.g., a pair of shared cache controllers that manage one last-level cache) are selected using a set of particular bits in the address. In an embodiment, one or more particular bits are hashed (e.g., XORed) with selected other bits in the address to select the group of caches and cache lines. Unless the operation specified in the memory request results in a cache miss, the memory request is processed at the selected cache. In the case of cache miss, an on-chip local cache controller processes the request and arranges for data to be fetched from the main memory.

Figure 1:
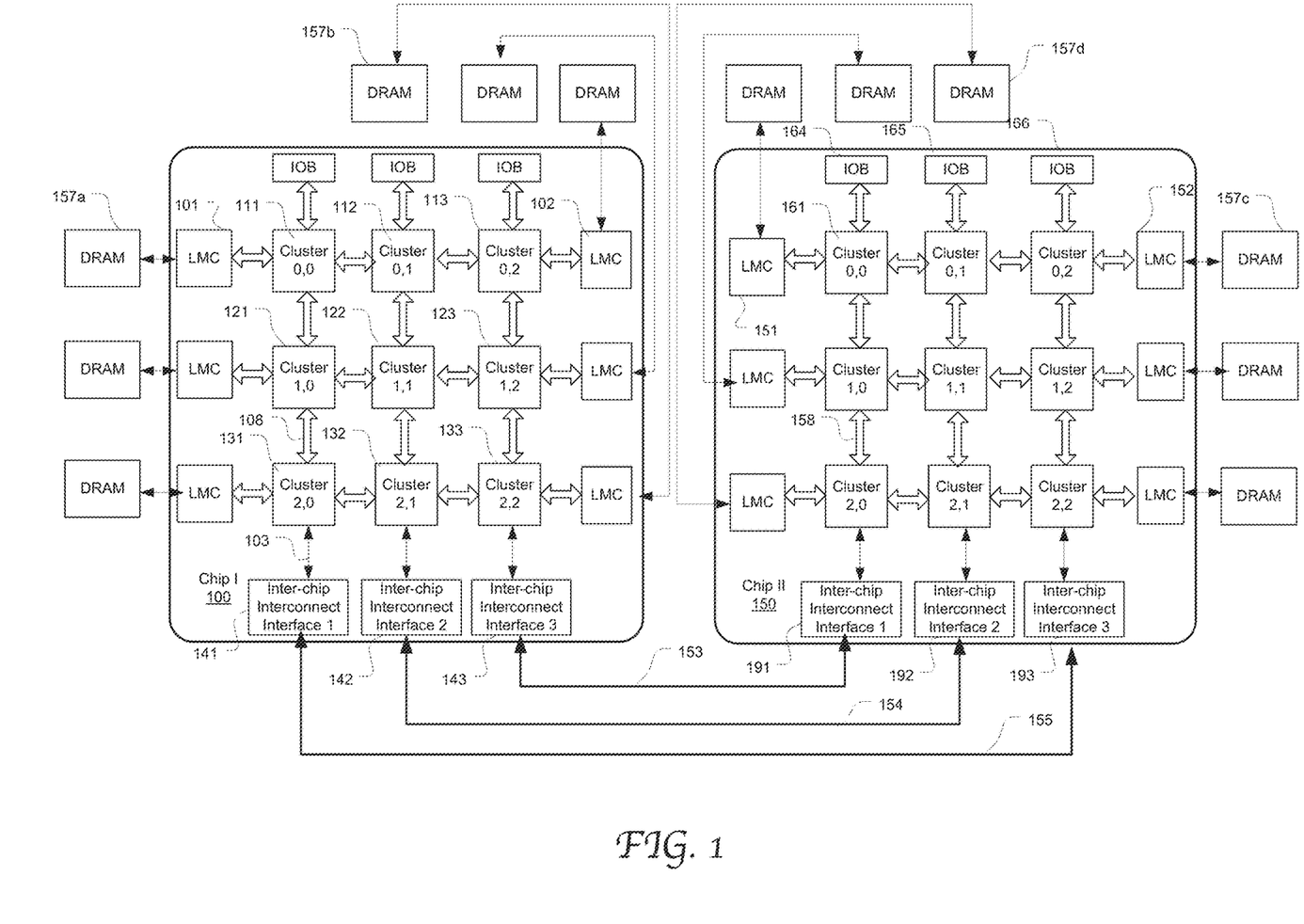
FIG. 1 illustrates the configuration of an exemplary multi-chip processing system where two columns of clusters in different chips are communicatively coupled by means of column-specific inter-chip interconnect interfaces in accordance with an embodiment of the present disclosure.

FIG. 1 illustrates the configuration of an exemplary multi-chip processing system where two columns of clusters in different chips are communicatively coupled by means of column-specific inter-chip interconnect interfaces in accordance with an embodiment of the present disclosure. The system includes a first processor chip (chip I 100) and a second processor (chip II 150). Each chip has a matrix of clusters (e.g., clusters 111 and 161) arranged in a three-by-three mesh design. However, it will be appreciated that the present disclosure is not limited to any specific number of clusters or columns in each chip.

As described in greater detail with reference to FIG. 2, each cluster in the chips 100 and 150 includes multiple processing cores and one or more shared cache controllers, e.g., each core being a central processing unit (CPU). The two chips 100 and 150 are both coupled to off-chip main memory. The present disclosure is not limited to any specific type of main memory. In the illustrated example, each row is coupled to a local memory controller (e.g., LMC 101, 102, 151 or 152) enabling the core processors to access an external dynamic random access memory (DRAM) (e.g., DRAMs 157a, 157b, 157c, or 157d).

According to embodiments of the present disclosure, in each chip, the clusters are divided into groups and each cluster group is communicatively coupled to a separate inter-chip interconnect interface residing on the same chip. The group-specific interconnect interface serves to route traffic between the clusters in the instant group and the clusters in a specific group residing in the other chip. Thus, a pair of groups respectively residing on two chips are communicatively coupled, and inter-chip communications are performed within each paired group of clusters. For example, the inter-chip communications are related to memory access transactions in a memory coherence scheme.

In the embodiments described in detail herein, in each chip, each column of clusters is configured as a group. Herein, the location of each cluster is denoted by its row index and column index. Each column in one chip is communicatively coupled to (or paired with) a specific column in the other chip and is not communicatively coupled to any other column in the other chip. Thus, inter-chip communications are carried out within respective columns. This can advantageously avoid cross-column routing for the communication signals as dictated by the convention design in which each chip has a centralized inter-chip interconnect interface. Thus, the chip routing design can be simplified and signal latency can be significantly reduced. Also, as the inter-chip communications are distributed across multiple inter-chip interfaces, request congestion can be advantageously and significantly reduced, further reducing the system latency.

As illustrated in FIG. 1, in chip I 100, the first column (the leftmost column and column index=0) includes the clusters 111, 121 and 131 and the inter-chip interconnect interface 1 (interface 141) disposed at the end of the column. A communication path 108 including one or more buses is routed through the entire column. Similarly, the second column (column index=1) includes the clusters 112, 122 and 132 and the interconnect interface 2 (interface 142); the third column (column index=2) includes the clusters 113, 123 and 133 and the interconnect interface 3 (interface 143). The communication paths (e.g., 108 and 158) provide communication media to and from the clusters (including core processors, shared cache controller, shared cache). Each inter-chip interface (e.g., interface 141) is coupled to a column of clusters through a communication path (e.g., path 103) The chip II 150 has the same mesh design which defines the leftmost column having the natural column index=0 for example. Each cluster can communicate via the column or row paths to other clusters on the same chip.

Each column in chip I 100 is paired (or linked) with a column in the chip II 150. Each cluster in chip I 100 is paired with another cluster in the chip II 150, and the paired clusters are located on two linked columns. The main memory addresses that a given shared cache controller handles are compatible with the corresponding cache controller on the other chip. Particularly, the shared cache controllers in each paired cluster are respectively configured to manage and control access of two shared caches residing in the two chips, and the two caches are configured to cache data for the same set of DRAM addresses.

Figure 5:
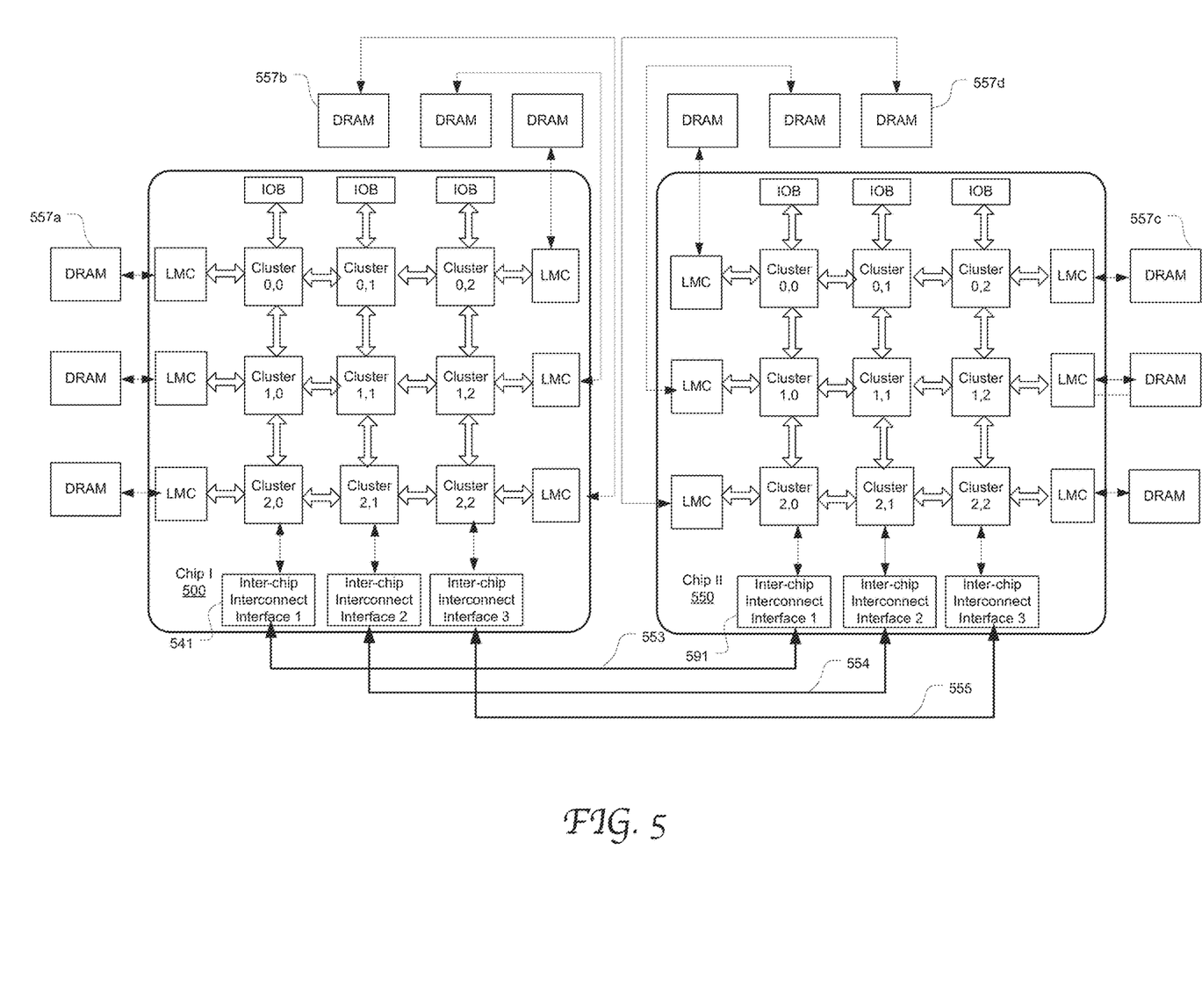
FIG. 5 illustrates the configuration of another exemplary multi-chip processing system in which two chips are communicatively coupled without mirroring in accordance with an embodiment of the present disclosure.

In some embodiments, given a memory request, the main memory address contained therein is mapped to a pair of shared memory cache controllers associated with the address. For example, one or more bits of the memory address are hashed to select the cache controllers. In some embodiments, each pair of linked columns have the same natural column index as defined by the mesh design. The two chips may be placed in a so-called "stacked" manner, as shown in FIG. 5 for example. In this scenario, mapping the memory address can directly result in both locations of the pair of cache controllers (e.g., the column index and row index in the mesh design) since they are the same.

Figure 4:
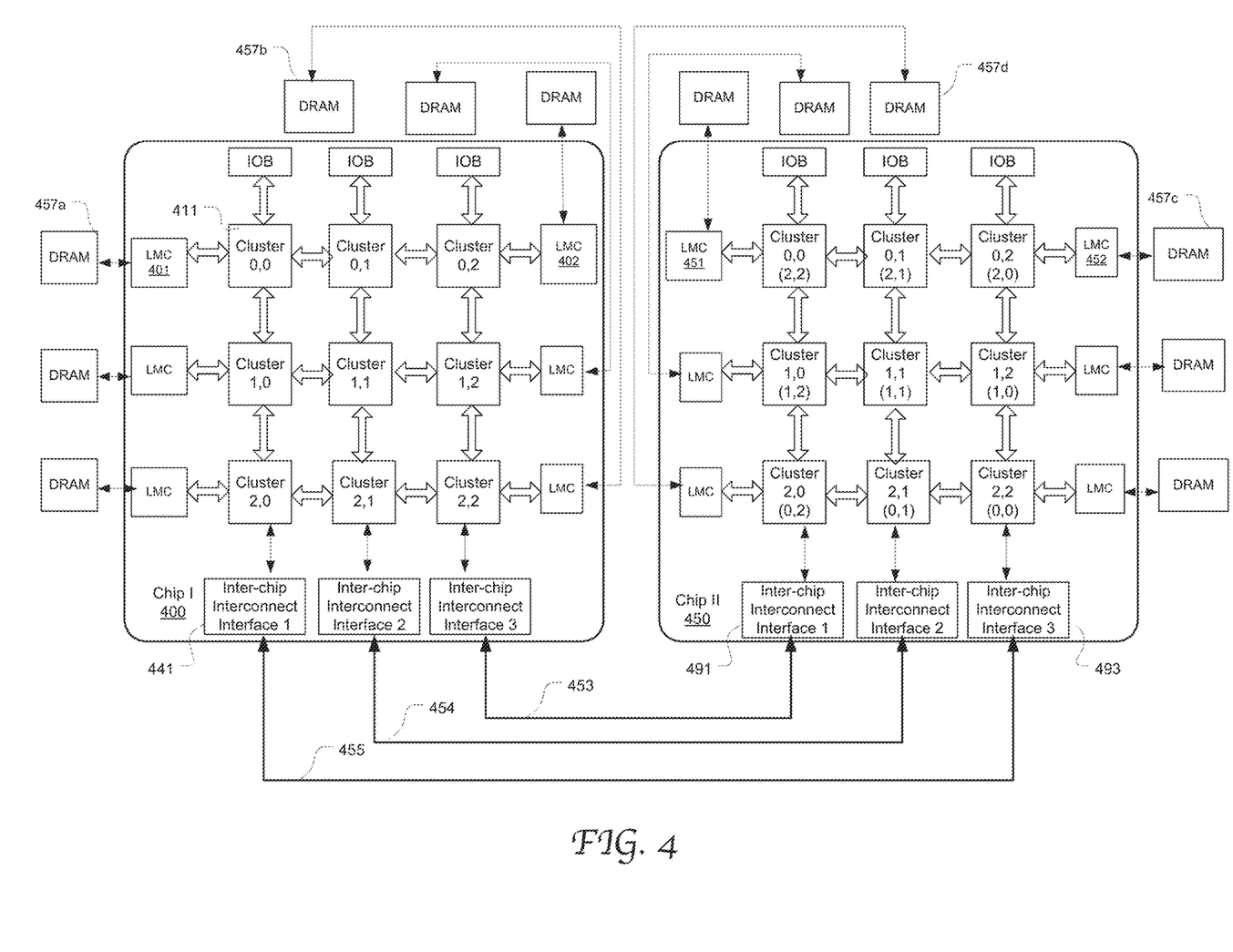
FIG. 4 illustrates the configuration of another exemplary multi-chip processing system in which the two chips are communicatively coupled in a mirrored fashion both column-wise and row-wise in accordance with an embodiment of the present disclosure.
Figure 6:
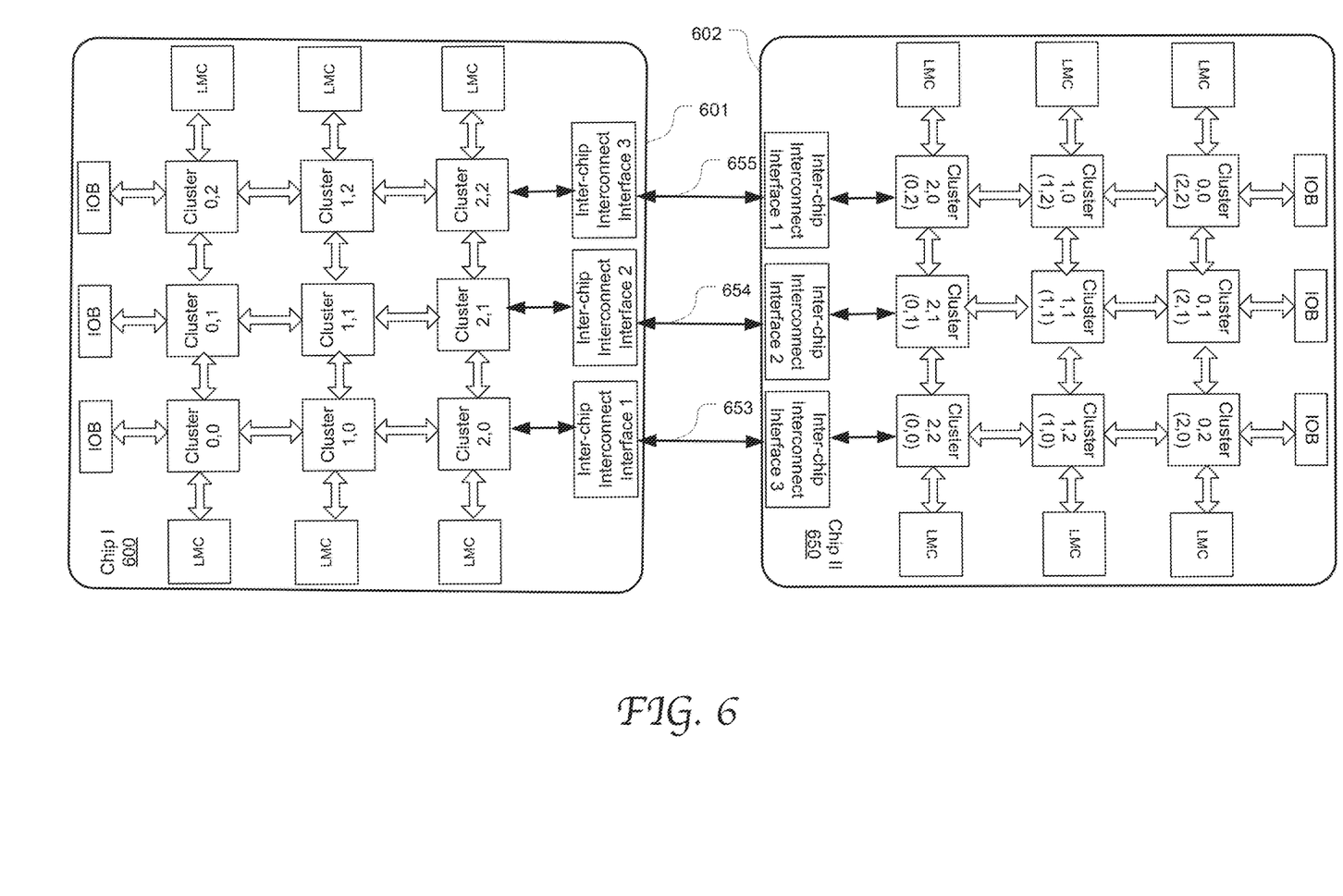
FIG. 6 illustrates the configuration of another exemplary multi-chip processing system which the two chips are communicatively coupled in a mirrored fashion both column-wise and row-wise in accordance with an embodiment of the present disclosure.

However, in some other embodiments, a column may be linked with a remote column having a different column index. In one embodiment, the two chips may be placed in a so-called "mirrored" manner, as shown in FIGS. 1, 4, 6 for examples. In FIG. 1, each pair of linked columns, as well as each pair of shared cache controllers, have mirrored column indices. Particularly, a column on chip I 100 has the natural index j, and its linked column on the second chip has the natural index n−j, where n represents the total number of columns in one chip. As shown, column 0/chip I is linked with column 2/chip II through the external link 155; column 1/chip I is linked with column 1/chip II through the external link 154; and column 2/chip I is linked with column 0/chip II through the external link 153. Correspondingly, each pair of clusters (and the shared cache controllers therein) have different column indices in the mesh design. As illustrated, for example, the clusters (0,0), (2,1) and (1,2) in the chip I 100 are respectively paired with the clusters (0,2) (2,1) and (1,0) in the chip II 150.

In some embodiments, the chips in a multi-chip system can support multiple inter-chip connection configurations. For example, a chip can generate a programmable indication that correlates the column indices of paired columns in the two chips. In the illustrated, each chip includes 3 columns and the two chips are connected either stacked or mirrored. For instance, during operation, when a shared cache controller (not explicitly shown) in the cluster 111 receives a memory request originated by a core processor in cluster (0,0) in chip I 100 (cluster 111), the cache controller determines whether the associated shared cache on chip I 100 stores the requested data block. If not, the memory request is sent to the inter-chip interconnect interface 1 (interface 141) via the communication path 103. The memory address in the memory request is mapped to a cache controller location represented in column and row indices. The column index is then mirrored to obtain the remote cache controller location. As a result, the interface 141 can locate the cluster on the chip II 150 that includes the remote cache controller. Particularly, mapping the memory address results in the cluster location of (0,0). Due to the indication by the mirror bit, mirrored hashing is performed and results in the cluster location of (0,2) (cluster 163).

Due to the mirrored configuration, the external links 153-155 can be routed in parallel without crossing. The two chips 100 and 150 may face each other as they are installed on a motherboard. This can advantageously simplify the design and processing of the external links.

In addition, each column includes a respective JOB, IOBs 114-116 on the chip I 100 and IOBs 164-166 on the chip II 150. One or more coprocessors (not shown) may be coupled to the core processors and caches in the clusters through the IOBs. A coprocessor may include, for example an I/O device, a compression/decompression processor, a hardware accelerator, a Peripheral Component Interconnect Express (PCIe) bus, or the like. The coprocessor may be configured to store data in, or load data from, the caches in the clusters, send or assign processing tasks to core processors on the chip, or receive data or processing tasks from other components on the chip.

In some embodiments, each chip further includes an intra-chip interconnect interface including control logic (e.g., an intra-chip control hub) and buses and configured to control the communications among IOBs, the local memory controllers, clusters and the inter-chip interconnect interfaces. The intra-chip interconnect interface may include logic and paths to implement memory coherence within the chip. In one embodiment, the intra-chip interconnect interface includes a cross-bar structure. It will be appreciated that each chip and each cluster may include various components that are well known in the art.

Figure 2:
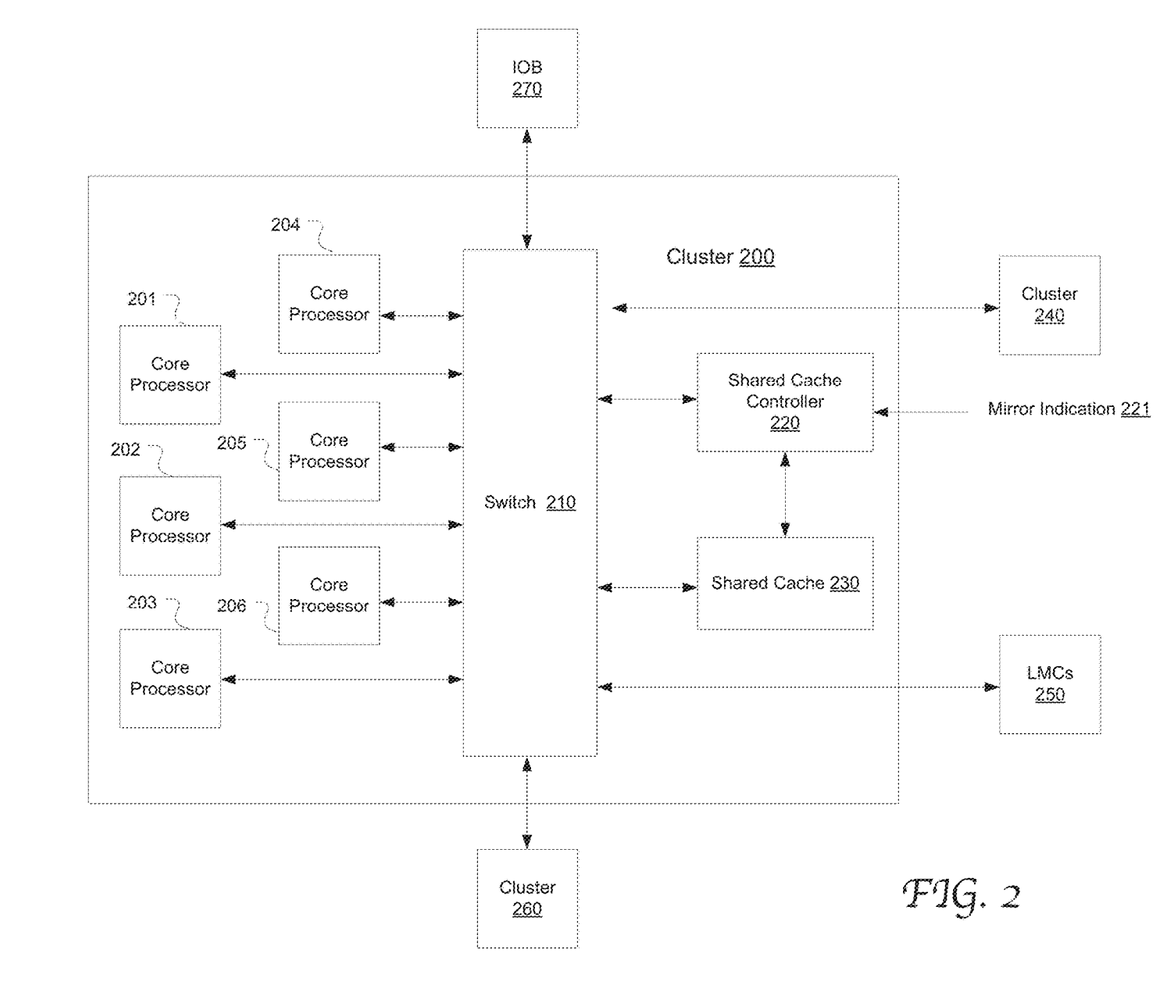
FIG. 2 illustrates the configuration and composition of an exemplary cluster in a chip in accordance with an embodiment of the present disclosure.

FIG. 2 illustrates the configuration and composition of an exemplary cluster 200 in a chip in accordance with an embodiment of the present disclosure. The cluster 200 includes six core processors 201-206, e.g., application processors. However, this number is merely exemplary. The core processors are each coupled to level-one (L1) caches, including one or more instruction caches and data caches. The cluster also includes a shared cache 230 accessible to all the core processors 201-206 through a switch 210, e.g., a level-two (L2) cache or last-level cache (LLC). The switch 210 has switching circuits and logic configured to conduct communication traffic to and from the cluster 200, including communications with the IOB 270, the other clusters (e.g., 260 and 240) within the chip and the local memory controllers 250. In one embodiment, the shared cache 230 is partitioned into multiple tag-and-data caches (TADs). Each of the L1 and L2 caches in the cluster 200 may be an N-way associative cache, e.g., N=4. The shared cache controller 220 manages and control access to the shared cache 230. In one embodiment, the shared cache 230 is part of the shared cache controller 230. The shared cache 230 and the shared cache controllers may be shared among the core processors of all the clusters in this chip. The core processors 201-206 access a main memory (e.g., an off-chip DRAM) through the local memory controllers 250.

During operation, for instance, a memory request associated with a data block or any corresponding cache block is initiated by a core processor (e.g., 201) or a coprocessor via the IOB 270. More specifically, the core processor or the IOB sends the memory request to the shared cache controller 220. The shared cache controller 220 checks locally if shared cache on the instant chip associate with the data block (other than the local cache associated with the requesting agent) caches the data block. If a cache hit results, the data is accessed from the shared cache or the shared cache is updated.

If a cache miss results, the shared cache controller 220 can identify the corresponding cache controller in the other chip and forward the memory request to it. According to embodiments of the present disclosure, one or more indications are used to indicating the relative cluster locations between the chips with reference to the mesh design, as described in greater detail with reference to FIGS. 1, 4 and 5-6. Based on the indication(s) and the main memory address contained in the memory request, the corresponding remote cache controller can be selected or identified. The one or more indications may be column-wise and/or row-wise mirror indications 221.

Figure 3:
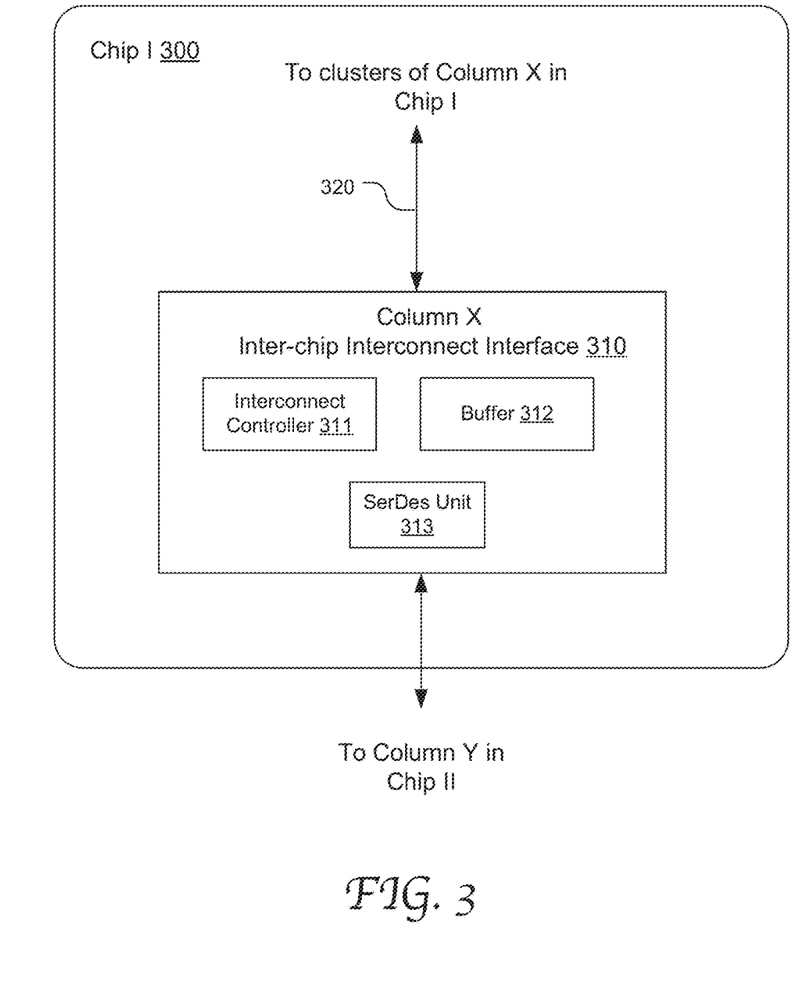
FIG. 3 illustrates the configuration of an exemplary column-specific inter-chip interconnect interface in accordance with an embodiment of the present disclosure.

FIG. 3 illustrates the configuration of an exemplary column-specific inter-chip interconnect interface 310 in accordance with an embodiment of the present disclosure. For example, the inter-chip interface 310 is configured to interconnect column X in the chip I 300 and may be disposed proximate to the edge of the chip. According to embodiments of the present disclosure, the interface 310 can forward instructions and data received through the communication path 320 to its linked column (e.g., column Y) on chip II, and route instructions and data received from column Y on chip II to a component on chip I.

In one embodiment, the interconnect interface 310 includes an interconnect controller 311, a buffer 312 and a serializer/deserializer (SerDes unit) 313. Various other components and functions may be implemented in the inter-chip interconnect interface 310 without departing from the scope of the present disclosure. The interface controller 311 may be capable of exchanging messages with the core processors and the shared cache controllers that are comprised in column X/chip I and column Y/chip II. The interface controller 311 may classify outgoing data messages from column X/chip I (e.g., by channels), form data blocks encompassing such data messages, and transmit the data blocks to column Y/chip II via the output ports. The interconnect controller 311 is operable to communicate with the inter-chip interconnect interface associated with column Y/chip II (not explicitly shown). Transmitted data blocks may be stored in the buffer 312, e.g., until receipt of the data block is acknowledged by the receiving chip. Similarly, the controller 311 may also classify incoming data messages, form blocks of such incoming messages, and route the formed blocks to column X communication path 320. In some embodiments, memory requests and data exchanged between two cache controllers are sent through specific columns. Other traffic may need to use the intra-chip interconnect to get to, or from, the column (and its corresponding inter-chip interconnect) when being sent or received, such as returned data to the processor for the request, or data from the DRAM.

FIG. 4 illustrates the configuration of another exemplary multi-chip processing system in which the two chips are communicatively coupled in a mirrored fashion both column-wise and row-wise in accordance with an embodiment of the present disclosure. Similar with the embodiment shown in FIG. 1, the two chips 400 and 450 in FIG. 4 each have the same three-by-three mesh design which defines the natural column indices 0~2 (leftmost being 0) and natural row indices 0~2 (top most being 0). Each multi-core processor cluster shown in FIG. 4 may have the similar configurations as described with reference to FIG. 2-3 for example. The two chips 400 and 450 are coupled to off-chip DRAMs e.g., 457a-457d, and have local memory controllers (LMCs 401 and 402 or 451 and 452) residing on the chips to enable access to the DRAMs 457a-457d. A column-specific interconnect interface (e.g., 441 or 491) provides an interface between linked columns on different chips.

Similar with the embodiment shown in FIG. 1, the chips 400 and 450 are linked in the manner that each pair of linked columns have mirrored indices. More specifically, column 0/chip I is linked with column 2/chip II through the external link 455; column 1/chip I is linked with column 1/chip II through the external link 454; and column 2/chip I is linked with column 0/chip II through the external link 453. As they are installed, the two chips may both be placed in plane with the motherboard and have the same orientation. Regarding the routing layout on the motherboard, the external links 453-455 need not cross each other.

Each cluster (and the shared cache controller therein) in the chip I 400 is paired with another cluster (and the shared cache controller therein) in the chip II 450, and the paired clusters are located on a pair of linked columns. Different from the embodiment shown in FIG. 1, the cluster locations in chip II are mirrored row-wise as well relative to the cluster locations in chip I which preserves their natural locations. As shown in FIG. 4, the clusters in row 0/chip I are paired with those in row 2/chip II, and the clusters in row 2/chip I are paired with those in row 0/chip II. For example, the clusters (0,0), (2,1) and (1,2) in chip I 400 are respectively paired with the clusters (2,2) (0,1) and (1,0) in chip II 450. In this configuration, the signals for cross-chip communications between each pair of cache controllers travel substantially the same distance. In contrast, in FIG. 1, the clusters (0,0), (2,1) and (1,2) in chip I 100 are respectively paired with the clusters (0,2) (2,1) and (1,0) in chip II 150.

During operation, when a shared cache controller (not explicitly shown) in the cluster (0,0) chip I (clusters 411) receives a memory request originated by a core processor in chip I 400, the cache controller determines whether the associated shared cache on the chip I 400 stores the requested data block. If not, the memory request may be sent to the inter-chip interconnect interface 1 (interface 441). A mirror indication is generated on chip I to indicate the column and row mirroring. As a result, the interface 441 can locate the cluster on the chip II 450 that includes the other cache controller associated with the same memory address. The memory request is then forwarded to the interface 3 on chip 2 493 via the external link 455.

FIG. 5 illustrates the configuration of another exemplary multi-chip processing system in which two chips are communicatively coupled without mirroring in accordance with an embodiment of the present disclosure. Similar with the embodiment shown in FIGS. 1 and 4, the two chips 500 and 550 each have the same three-by-three mesh design which defines the natural column indices 0~2 and natural row indices 0~2. Each multi-core processor cluster shown in FIG. 5 may have the similar configurations as described with reference to FIG. 2-3 for example. The two chips 500 and 550 are coupled to off-chip DRAMs 557a-557d, and have local memory controllers residing on the chips to enable access to the DRAMs 457a-457b. A column-specific interconnect interface (e.g., 541 or 591) provides an inter-chip interface between linked columns residing on different chips.

In this embodiment, each chip preserves the natural column indices and row indices in inter-chip communication. That is, the two clusters in each pair have the natural cluster locations as defined by the mesh design. For example, clusters (0,0), (2,1) and (1,2) on chip I 500 are paired with clusters (0,0), (2,1) and (1,2) on chip II 550, respectively. The two chips may be both placed in plane with the motherboard and in the same orientation. Regarding the routing layout on the motherboard, the external links 553-555 coupled between respective pairs of linked columns cross each other.

FIG. 6 illustrates the configuration of another exemplary multi-chip processing system in which the two chips are communicatively coupled in a mirrored fashion both column-wise and row-wise in accordance with an embodiment of the present disclosure. The clusters (and the shared cache controllers therein) in FIG. 6 are paired in the same manner as in FIG. 4. Thus, a share memory cache controller can identify the other in the pair by using the same mirror indication as described in FIG. 4. The two chips in FIG. 6 are placed on the same horizontal plane as they are installed on the motherboard. The inter-chip interconnect interfaces of the two chips are respectively disposed proximate to the chip edges 601 and 602, and, different from the FIG. 4 embodiment, these edges 601 and 602 face each other as they are installed. In this configuration, the external links 653-655 between the linked columns can be made very short and non-crossing.

Figure 7:
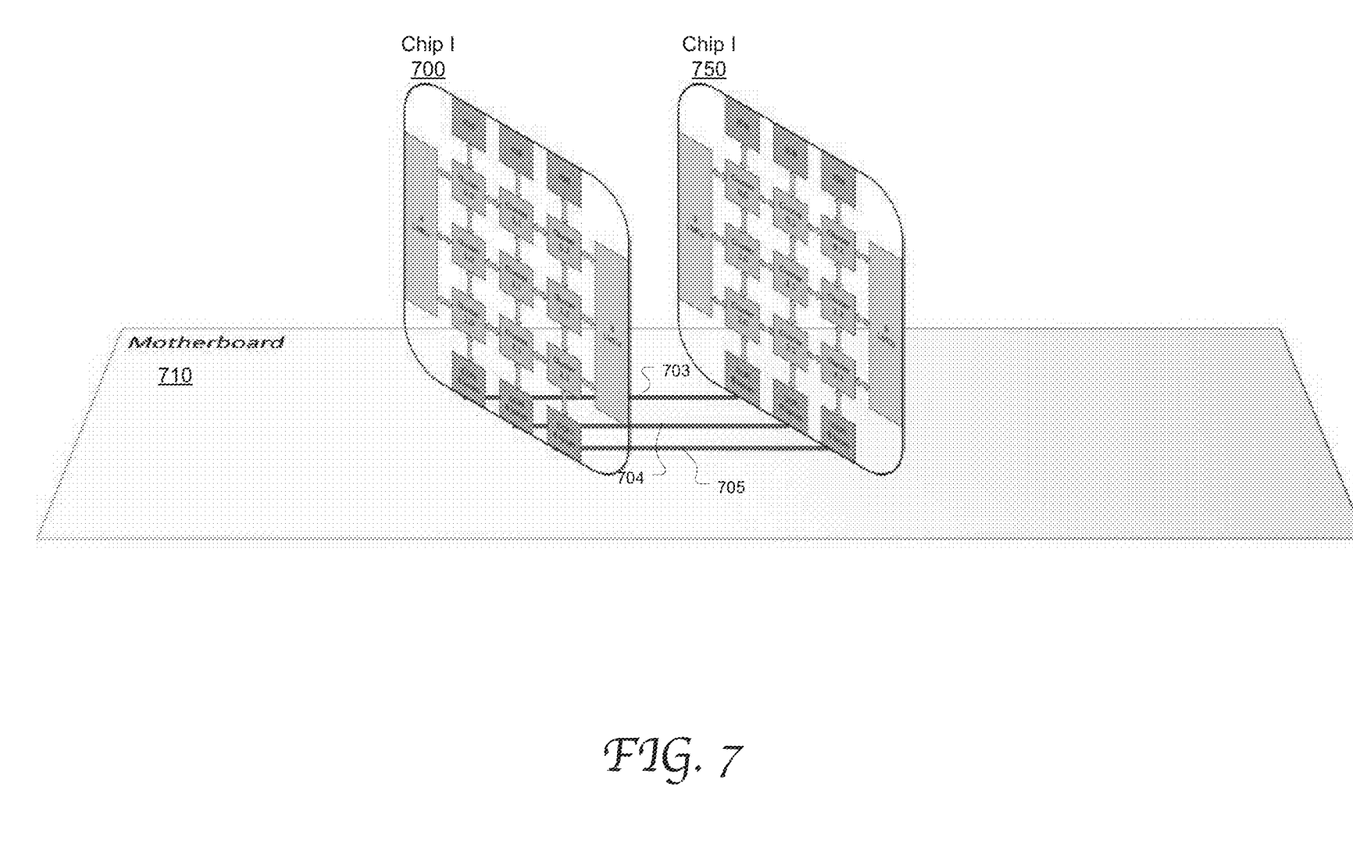
FIG. 7 illustrates the configuration and installation position of another exemplary multi-chip processing system in which two chips are communicatively coupled without mirroring in accordance with an embodiment of the present disclosure.

FIG. 7 illustrates the configuration and installation position of another exemplary multi-chip processing system in which two chips are communicatively coupled without mirroring in accordance with an embodiment of the present disclosure. The clusters (and the shared cache controllers therein) in FIG. 7 are paired in the same non-mirroring manner as in FIG. 5. Thus, a shared memory cache controller can identify the other in the pair by using the same natural column and row indices as described in FIG. 5. Different from the embodiment in FIG. 5, the two chips are installed substantially perpendicular to the motherboard 710. The front side of chip II 750 faces the back side of chip I 700. In this configuration, the external links 703-705 coupled between the linked columns can be very short and non-crossing. The external links 703-705 may be printed on the motherboard, e.g., a Printed Circuit Board (PCB).

Figure 8A:
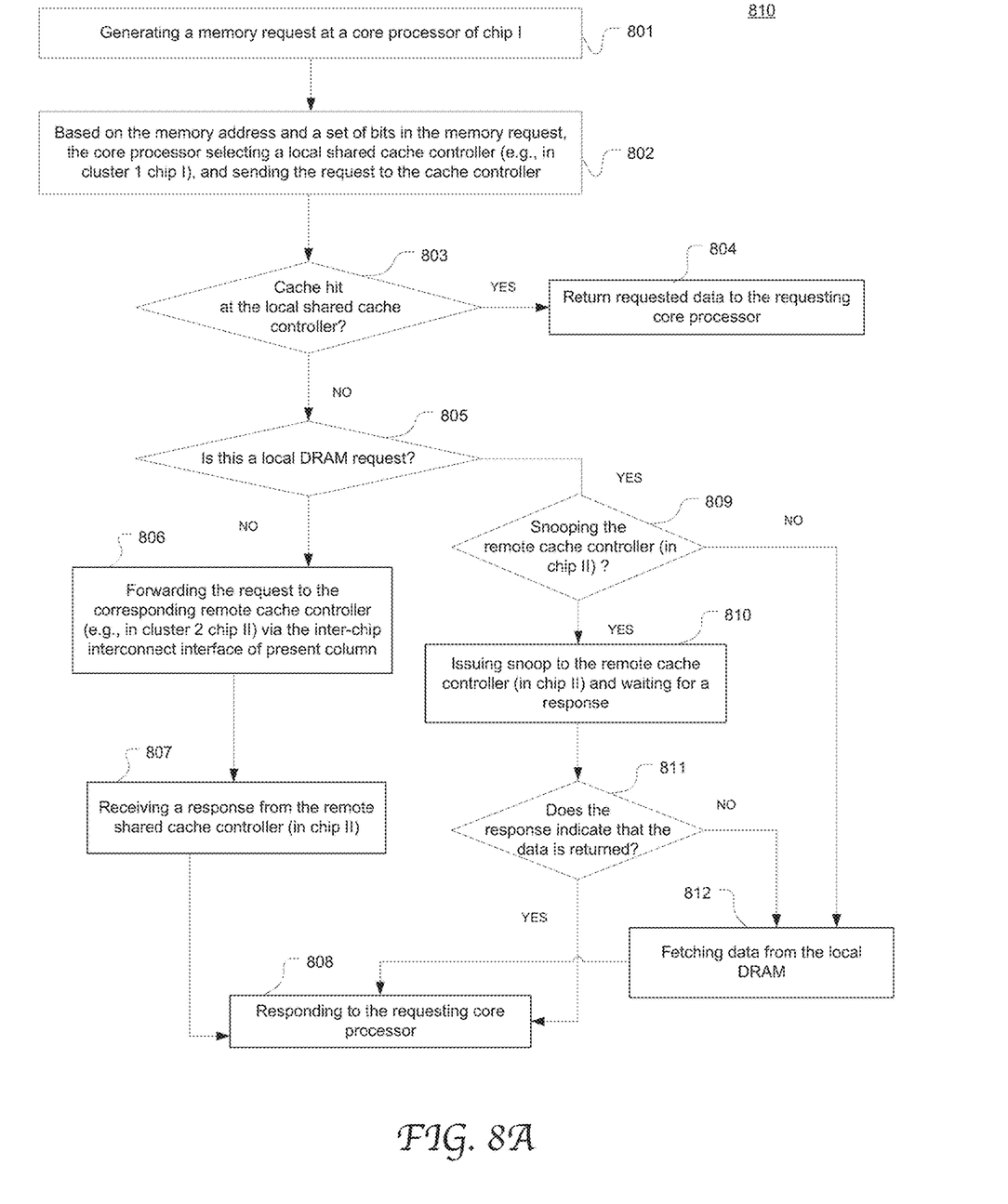
FIGS. 8A-8C are flow charts depicting exemplary processes of processing a memory request in a multi-chip system in accordance with an embodiment of the present disclosure.
Figure 8B:
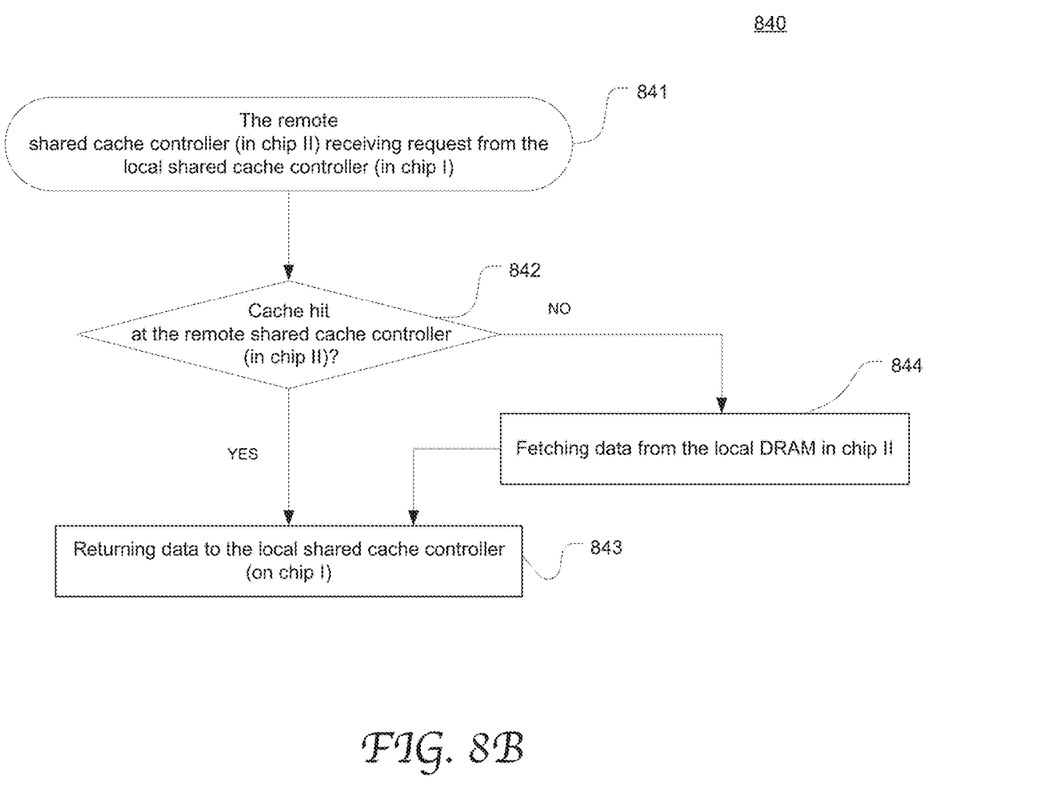
Figure 8C:
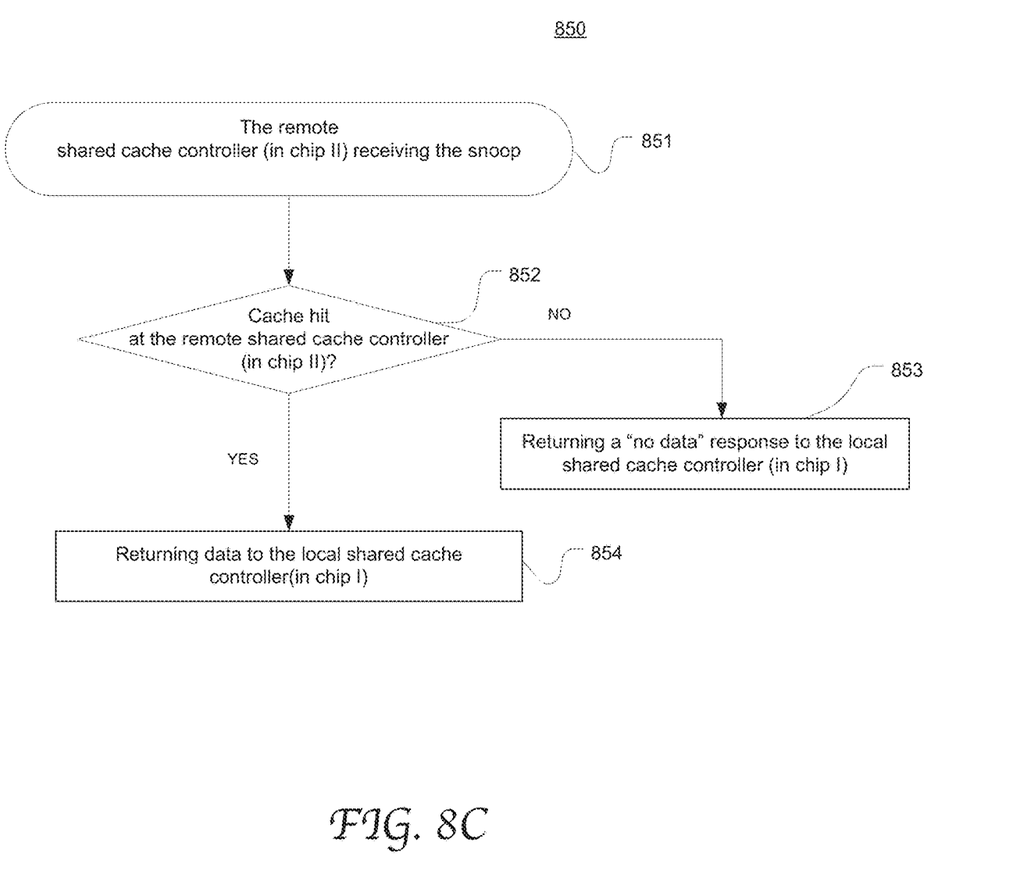

FIGS. 8A-8C are flow charts depicting exemplary processes (processes 810, 840 and 850) of processing a memory request in a multi-chip system in accordance with an embodiment of the present disclosure. The illustrated processes may be performed by any multi-chip system as described with reference to FIGS. 1-7. However, they may be performed by using any other suitable multi-chip processing system without departing from the scope of the present disclosure.

At 801, a memory request is generated in a cluster (cluster 1) of a first chip (chip I) and the memory request may be initiated by a core processor in chip I. Alternatively, the memory request may be initiated by an IOB on behalf of a coprocessor coupled to chip I. The memory request is a message or command associated with a data block in the main memory or corresponding shared cache blocks.

At 802, based on the memory address and a set of bits (e.g., by hashing the bits) in the memory request, the core processor selects a local shared cache controller in chip I and sends the request to this cache controller. If the local shared cache controller determines (at 803) that a cache hit results from the local shared cache, the requested data is accessed from the cache and returned to the requesting core processor at 804.

If the local shared cache controller determines (at 803) that a cache miss results from the local shared cache, the cache controller further determines whether it is a local DRAM request at 805. If not, at 806, the request is forwarded to the corresponding remote shared cache controller (e.g., located in cluster 2 chip II) via the inter-chip interconnect interface of this column. The remote cache controller (on chip II) may process the request according to process 840 as shown in FIG. 8B. At 807, the local cache controller receives a response from the remote cache controller. At

808, the local cache controller responds to the requesting core processor based on the response.

If the memory request is a local DRAM request as determined at 805, the local cache controller further determines whether it needs to snoop the remote cache controller. If not, the local cache controller fetches data from the local DRAM at 812. If yes, the local cache controller issues a snoop to the remote cache controller and wait for its response at 810. The remote cache controller (on chip II) may process the snoop according to process 850 as shown in FIG. 8C and returns a response to the local shared cache controller (on chip I). If the response indicates that the data is returned (as determined at 811), the local shared cache controller (on chip I) responds to the requesting core processor with the data at 808. If the response indicates that the data has not been returned, the data is fetched from the local DRAM at 812, and the local cache controller responds to the requesting core processor with the fetched data at 808.

FIG. 8B shows the process 840 that a remote shared cache controller (located in cluster 2 chip II) processes a memory request forwarded from the local shared cache controller (located in cluster 1 chip I) in accordance with an embodiment of the present disclosure. At 841, the remote cache controller (in chip II) receives the request sent from the local shared cache controller (in chip I). At 842, it determines whether cache hit results from the remote shared cache. If yes, the remote cache controller (in chip II) returns data to the local cache controller (in chip I) at 843. If not, the data is fetched from the local DRAM in chip II at 844.

FIG. 8C shows the process 850 that a remote shared cache controller (located in cluster 2 chip II) processes a snoop from chip 1 in accordance with an embodiment of the present disclosure. At 851, the remote cache controller (on chip II) receives the snoop sent from the local memory controller in cluster 1 chip I. At 852, it determines whether a cache hit results from the remote shared cache (in chip II). If yes, the remote cache controller (in chip II) returns data to the local cache controller (in chip I) at 854. If not, the remote cache controller (in chip II) returns a "no data" response to the local cache controller (in chip I) at 853.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A device, comprising:
 a plurality of clusters, wherein each cluster of said plurality of clusters comprises:
 a set of core processors, a shared cache, and a shared cache controller; and
 a set of interconnect interfaces configured to communicatively couple said device with another device that comprises another plurality of other clusters, wherein each cluster of said another plurality of other clusters comprises: a set of core processors, a shared cache, and a shared cache controller;
 wherein each interconnect interface of said set of interconnect interfaces is configured to route signals between a respective group of clusters of said plurality of clusters of said device and a respective group of clusters of said another plurality of other clusters of said another device, wherein said device is coupled to a memory, and wherein a shared first cache controller of a cluster of said plurality of clusters of said device is configured to control data caching for a set of memory addresses of said memory.

2. The device of claim 1, wherein a shared second cache controller of a cluster of said another plurality of other clusters is associated with a shared cache of said another device, and wherein said shared second cache controller is configured to also control data caching for said set of memory addresses.

3. The device of claim 2, wherein said shared first cache controller is further configured to:
 receive a memory request comprising a data block and a memory address encompassed in said set of memory addresses; and
 when said data block is not stored in a shared cache of a cluster of said plurality of clusters of said device: send said memory request to said shared second cache controller via an interconnect interface of said set of interconnect interfaces.

4. The device of claim 2, wherein said shared first cache controller is further configured to:
 receive a memory request comprising a data block and a memory address encompassed in said set of memory addresses;
 generate a first indication for identifying said shared second cache controller based on said memory address and based on a second indication indicative of a location of said shared second cache controller in relation to a location of said shared first cache controller within said plurality of clusters; and
 send said first indication to an interconnect interface of said set of interconnect interfaces.

5. The device of claim 1, wherein a shared second cache controller of a cluster of said another plurality of other clusters of said another device is configured to control data caching for said set of memory addresses, and wherein said shared first cache controller is further configured to:
 receive a memory request from said shared second cache controller, wherein said memory request comprises a data block and a memory address of said set of memory addresses; and
 determine if said data block is stored in a shared cache of a cluster of said plurality of clusters of said device.

6. The device of claim 1, wherein said shared first cache controller is further configured to generate a first indication for identifying a shared second cache controller of a cluster of said another plurality of other clusters of said another device, based on a memory address of said set of memory addresses and based on a second indication indicative of a relative orientation between said device and said another device on a motherboard.

7. The device of claim 1, wherein said shared first cache controller is further configured to generate a first indication for identifying a shared second cache controller of a cluster of said another plurality of other clusters of said another device, based on a memory address of said set of memory addresses and based on a second indication indicative of routing of external links that communicatively couple said device and said another device.

8. A system, comprising:
 a motherboard;
 a memory; and
 multiple devices installed in said motherboard and coupled to said memory, wherein each device of said multiple devices comprises;

a plurality of clusters, wherein each cluster of said plurality of clusters comprises: a set of core processors, a shared cache, and a shared cache controller; and a set of interconnect interfaces configured to communicatively couple said each device with another device that comprises another plurality of other clusters, wherein each cluster of said another plurality of other clusters comprises: a set of core processors, a shared cache, and a shared cache controller, wherein each interconnect interface of said set of interconnect interfaces is configured to route signals between a respective group of clusters of said plurality of clusters of said each device and a respective group of clusters of said another plurality of clusters of said another device, wherein said each device is coupled to said memory, and wherein a shared first cache controller of a cluster of said plurality of clusters of said each device is configured to control data caching for a set of memory addresses of said memory.

9. The system of claim 8, wherein a shared second cache controller of a cluster of said another plurality of other clusters is associated with a shared cache of said another device, and wherein said shared second cache controller is configured to also control data caching for said set of memory addresses.

10. The system of claim 9, wherein said shared first cache controller is further configured to:
receive a memory request comprising a data block and a memory address encompassed in said set of memory addresses; and
when said data block is not stored in a shared cache of a cluster of said plurality of clusters of said device: send said memory request to said shared second cache controller via an interconnect interface of said set of interconnect interfaces.

11. The system of claim 9, wherein said shared first cache controller is further configured to:
receive a memory request comprising a data block and a memory address encompassed in said set of memory addresses;
generate a first indication for identifying said shared second cache controller based on said memory address and based on a second indication indicative of a location of said shared second cache controller in relation to a location of said shared first cache controller within said plurality of clusters; and
send said first indication to an interconnect interface of said set of interconnect interfaces.

12. The system of claim 8, wherein a shared second cache controller of a cluster of said another plurality of other clusters of said another device is configured to control data caching for said set of memory addresses, and wherein said shared first cache controller is further configured to:
receive a memory request from said shared second cache controller, wherein said memory request comprises a data block and a memory address of said set of memory addresses; and
determine if said data block is stored in a shared cache of a cluster of said plurality of clusters of said device.

13. The system of claim 8, wherein said shared first cache controller is further configured to generate a first indication for identifying a shared second cache controller of a cluster of said another plurality of other clusters of said another device, based on a memory address of said set of memory addresses and based on a second indication indicative of a relative orientation between said device and said another device on said motherboard.

14. The system of claim 8, wherein said shared first cache controller is further configured to generate a first indication for identifying a shared second cache controller of a cluster of said another plurality of said other clusters of said another device, based on a memory address of said set of memory addresses and based on a second indication indicative of routing of external links that communicatively couple said device and said another device.

15. A method performed by a device comprising: a plurality of clusters, wherein each cluster of said plurality of clusters comprises a set of core processors, a shared cache, and a shared cache controller; and a set of interconnect interfaces configured to communicatively couple said device with another device that comprises another plurality of other clusters, wherein each cluster of said another plurality of other clusters comprises: a set of core processors, a shared cache, and a shared cache controller;
wherein said method comprises:
receiving, by a shared first cache controller of said device, a memory request, wherein said memory request comprises a data block and a memory address of a memory coupled to said device, wherein data caching is controlled for said memory address by said shared first cache controller; and
when said data block is not stored in a shared cache of a cluster of said plurality of clusters of said device: sending said memory request to a shared second cache controller via an interconnect interface of said set of interconnect interfaces, wherein said shared second cache controller is associated with a shared cache of said another device, and wherein said shared second cache controller is configured to also control data caching for said memory address.

16. The method of claim 15, further comprising:
generating a first indication for identifying said shared second cache controller based on said memory address and based on a second indication indicative of a location of said shared second cache controller in relation to a location of said shared first cache controller within said plurality of clusters; and
sending said first indication to said interconnect interface of said set of interconnect interfaces.

17. The method of claim 15, further comprising generating a first indication for identifying said shared second cache controller based on said memory address and based on a second indication indicative of a relative orientation between said device and said another device on a motherboard on which said device and said another device have been installed.

18. The method of claim 15, further comprising generating a first indication for identifying said shared second cache controller based on said memory address and based on a second indication indicative of routing of external links that communicatively couple said device and said another device.

19. The method of claim 15, wherein said sending comprises sending said memory request via an external communication path that is coupled between said device and said another device.

20. The method of claim 15, further comprising:
receiving, by said shared first cache controller, another memory request from said shared second cache controller via said interconnect interface, wherein said another memory request comprises another data block and said memory address; and determining if said another data block is stored in said shared cache of said cluster of said device.

* * * * *